(12) United States Patent
Rosenberg et al.

(10) Patent No.: US 7,080,353 B2
(45) Date of Patent: Jul. 18, 2006

(54) ADDON MECHANISM FOR A CONTROL SYSTEM BASED ON A TYPE DATA FIELD

(75) Inventors: Jens Ansgar Rosenberg, Nuremberg (DE); Peter Wagner, Hersbruck (DE)

(73) Assignee: Siemens Aktiengesellschaft, Munich (DE)

( * ) Notice: Subject to any disclaimer, the term of this patent is extended or adjusted under 35 U.S.C. 154(b) by 520 days.

(21) Appl. No.: 09/968,284

(22) Filed: Oct. 1, 2001

(65) Prior Publication Data

US 2002/0083412 A1 Jun. 27, 2002

(30) Foreign Application Priority Data

Dec. 22, 2000 (DE) .......................... 100 65 955
Jun. 15, 2001 (DE) .......................... 101 28 959

(51) Int. Cl.
*G06F 9/44* (2006.01)

(52) U.S. Cl. .................. 717/108; 717/109; 717/116
(58) Field of Classification Search ......... 717/108–109, 717/114–116
See application file for complete search history.

(56) References Cited

U.S. PATENT DOCUMENTS

| | | | | |
|---|---|---|---|---|
| 4,901,221 A | | 2/1990 | Kodosky et al. | 364/200 |
| 5,572,731 A | * | 11/1996 | Morel et al. | 717/104 |
| 5,819,283 A | | 10/1998 | Turkowski | 707/103 |
| 5,953,526 A | * | 9/1999 | Day et al. | 717/108 |
| 6,028,998 A | * | 2/2000 | Gloudeman et al. | 717/108 |
| 6,032,152 A | * | 2/2000 | Pearson | 707/103 R |
| 6,064,812 A | | 5/2000 | Parthasarathy et al. | 395/701 |
| 6,192,371 B1 | * | 2/2001 | Schultz | 707/103 R |
| 6,477,527 B1 | * | 11/2002 | Carey et al. | 707/4 |
| 6,499,137 B1 | * | 12/2002 | Hunt | 717/164 |
| 6,526,566 B1 | * | 2/2003 | Austin | 717/109 |
| 6,601,234 B1 | * | 7/2003 | Bowman-Amuah | 717/108 |
| 6,611,954 B1 | * | 8/2003 | Knapton, III | 717/116 |
| 6,662,355 B1 | * | 12/2003 | Caswell et al. | 717/103 |
| 6,662,357 B1 | * | 12/2003 | Bowman-Amuah | 717/120 |
| 6,678,882 B1 | * | 1/2004 | Hurley et al. | 717/121 |
| 6,704,743 B1 | * | 3/2004 | Martin | 707/103 R |
| 6,853,964 B1 | * | 2/2005 | Rockwood et al. | 703/2 |

FOREIGN PATENT DOCUMENTS

EP 1 221 649 A 12/2001

OTHER PUBLICATIONS

Vanderdonckt et al, "Model based design generation and evaluation of virtual user interface", ACM pp 51–60, 2004.*
Svarstad et al, "A model for describing communication between aggregate objects in the specification and design of embadded systems", IEEE, pp 77–85, 2001.*
Lathrop et al, "An extensible object orienetd mixed mode funcational simulation system", IEEE, 22nd design automation conference, pp 630–636.*
Brugger, A. et al., FWP–Fach "Fortgeschrittene Programmiermethodik" im WS1997/98, Seminar: Objektorientiertes Modellieren und Design Patterns; 9 pages.
Hamilton, J.; "Interlanguage Object Sharing with SOM"; Conference on object–oriented Technologies, pp. 35–51; XP000645576.

(Continued)

Primary Examiner—Anil Khatri
(74) Attorney, Agent, or Firm—Baker Botts L.L.P.

(57) ABSTRACT

Flexible extension of a control system needs to be possible without touching the original object model and hence the control software. To this end, the invention proposes attaching data elements which contain registration information for existing and newly added tools to object data. An object type can then be instantiated selectively for the existing or new tools. This allows extensions to be instantiated subsequently without affecting the essence of the existing object model.

12 Claims, 3 Drawing Sheets

OTHER PUBLICATIONS

"Inside Macintosh: Macintosh Toolbox Essentials"; Apple computer Inc., XP002311286, Chapter 1 and Chapter 7.
"Inside Macintosh: More Macintosh Toolbox"; Apple Computer Inc., Chapter 1; XP002311291.
Forman et al.; "Release–to–Release Binary Compatibility in SOM"; ACM Sigplan Notices; Association for Computing Machinery, New York, pp. 426–438; XP00537920.
Oliveria, "Virtual environment system layered object model", ACM ACE, pp. 194–202, 2004.*

Xiaogaung et al, "An object orienetd data framework for virtual environments with hierarchical modeling", ACM SIGSOFT, Software Eng. Notes vol. 24, No. 1, pp. 65–68, 1999.*

Chen et al, "Integrating virtual objects into real images for augumented reality", ACM VRST, pp. 1–8, 1998.*

Messa et al, "Visual software development using an object relationship model", ACM pp. 1–7, 1999.*

* cited by examiner

ADDON MECHANISM FOR A CONTROL SYSTEM BASED ON A TYPE DATA FIELD

FIELD OF THE INVENTION

The present invention relates to an apparatus and a method for controlling or regulating a system based on an object model which represents the functionality of a runtime system and/or of the system to be controlled or to be regulated. The object model comprises object types having a predetermined data structure, which can be processed by one or more internal standard tools.

BACKGROUND OF THE INVENTION

Modern industrial controllers generally comprise an "engineering system" and a "runtime system". The engineering system is used to develop a control program which is then subsequently loaded into the runtime system. The runtime system then ensures the time sequence control for the system to be controlled.

The functionality of the system to be controlled and/or of the runtime system can be expressed by an object model. The object model is effective in the engineering system and/or runtime system and is the basis for the engineering of the controller, for example, startup and programming etc. Furthermore, the object model is the basis for the data storage of the controller. The elements of the object model can be categorized into various object types. The object type is the software engineering form of a description of object instances. In the simplest form, this description relates to the data structure represented by an object instance in the memory. In systems today, the object type also describes operations which can be carried out on these data structures and thus also lends functionality to the object instances. An example of one of these object types is program containers used for managing and storing user programs. Other object types are technological object types, such as for positioning axes, synchronism axes, measuring gages, cam disks etc., the functionality of these object types being stored in the respective object type on a data engineering basis. Another significant object type is "devices" used for managing and storing hardware configuration settings.

All object types can be instantiated, i.e. can be embodied specifically. Thus, for example, a synchronism object can be allocated a specific transmission ratio. The technological object types can be organized in the form of technological packets. Instantiation is generally effected in the engineering system. Loading the instantiated objects into the runtime system initiates the instantiation of corresponding objects in the runtime system, to which objects the data of the objects from the engineering system are transmitted.

An object instance is first a data structure in the memory of a computer system. From one object type, it is possible to instantiate any desired number (to the extent permitted by the underlying computer system) of object instances. In this context, the size and organization of the data structure of each object instance follows the description provided by the object type. Object instances are set up at the execution time of an editor, that is to say while the program system is being executed on a computer system in the engineering system.

The object model comprises a set of object types and describes the relationships between object instances instantiated from the object types. The complexity of creating new object types to be inserted into a complex object model can be comparatively great.

In the engineering system, various tools can be used to access objects (instances) of particular object types. That is to say that the object types are defined when the software system is created and cannot be changed again in the engineering system. Accordingly, the engineering system permits one or more views to the instances of particular object types. Within the context of programming, these may be, by way of example, various editors for textual or graphical user programming. The tools and views of the engineering system are also called SnapIns. Besides the SnapIns present in the basic system, other SnapIns can be added to the engineering system.

An object type is more than just the description of a data structure. It also comprises operations which can be carried out on and using instances of this data structure. The internal tools of the basic engineering system access instances of the object types. Object types themselves are generally not changed again by the user.

In principle, engineering systems, like any other software, are also subject to constant renewal, extension and improvement. However, with today's implementation mechanisms for control extensions, the problems discussed below often arise. The introduction of a new programming view, e.g. the introduction of graphical programming in addition to textual programming, is today not possible in integrated fashion without extending the basic functionality of the engineering system. A possible external extension using external tools requires dedicated data storage, which is then not integrated into the existing system. The extension of an existing, for example graphical, programming language by additional programming icons, which requires extension of the data storage, is generally not possible without touching or extending the existing engineering system. Thus, for example, an existing flowchart editor cannot readily be extended by icons for particular library functions. In addition, today's OEM interfaces afford only a specific and restricted depth of integration into the engineering system. Finally, extensions of the engineering system functionality using external tools generally entail consistency problems in the data storage.

SUMMARY OF THE PRESENT INVENTION

The objective of the present invention is to describe, in relation to controllers, a method for flexibly extending control systems which does not require the original object model to be touched. The present invention achieves this objective by means of an apparatus for controlling or regulating a system based on a basic object model which represents the functionality of a runtime system and/or of the system to be controlled or to be regulated. The apparatus has a data processing device for processing a first object type which has a predetermined data structure which is part of the basic object model and which can be instantiated for objects. The data processing device is able to be used to attach at least one type data field to the first object type.

Further, the objective of the present invention is achieved by a method for controlling or regulating a system based on a basic object model which represents the functionality of a runtime system and/or of the system to be controlled or to be regulated. The object model comprises a first object type which has a predetermined data structure and can be instantiated for objects, by reading in or creating a virtual object type having a type data field, and instantiating the virtual data type for an object for which the type data field is filled with associated information relating to an additional tool which is not part of the basic object model.

The inventive extension mechanism advantageously permits scalable functional extension of the control software with a great depth of integration in the engineering system without touching the underlying software. The extensions can be in a form such that all existing engineering operations and transactions on the object types, e.g. browser, viewer, copying, inserting, importing, exporting, etc., also act on the extensions and can be used in a familiar manner.

Another advantage is that OEM extensions for new object types and new viewers are generically possible and require no changes to the basic software in the engineering system.

BRIEF DESCRIPTION OF THE DRAWINGS

The present invention is now explained in more detail below with reference to the drawings, in which.

DETAILED DESCRIPTION OF THE INVENTION

Figure 1:
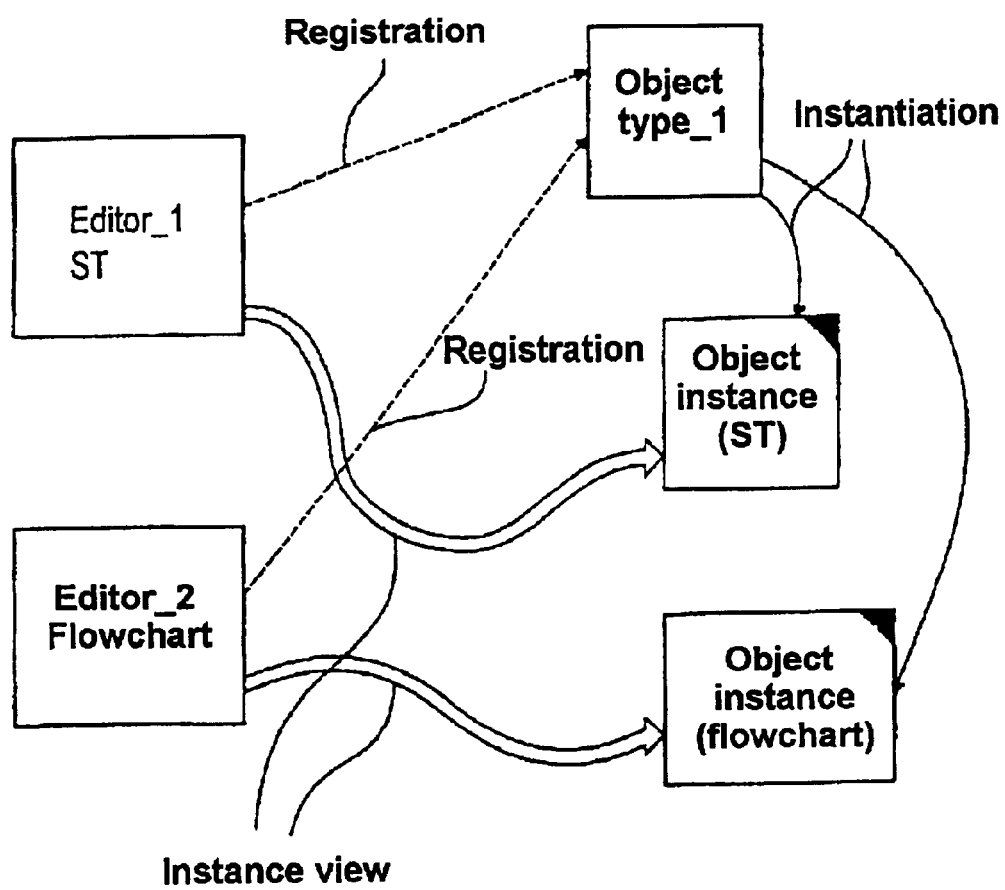
FIG. 1 shows a diagram of the inventive functional connection between tools and objects.

The exemplary embodiment of the invention as shown and discussed below illustrates one preferred application of the present invention. A few significant modules of the engineering system relate to the provision of a (graphical) user interface which the user uses to access the project data. Object instances contained in the project are represented in the user interface (e.g. display in the project browser, opening of editors, menus presented) on the basis of particular rules. In a nonextendable system known to date, the rules relate to the object type of the individual object instances (e.g. a program object instance is associated with a structured text editor using the rule: "instances of the program type are processed using the structured text editor"). In the system of the present invention, to which new views/editors can be introduced in the form of "SnapIns", the rules are entered by the SnapIns as they are registered in the engineering system. In this context, the object types are identified by unique designators.

The present invention thus makes it possible to introduce rules for "virtual types" which are not yet known or included in the programming of the basic object model and are subsequently adopted by the user or system constructor in a "private object model". In this context, the rules are formulated in a similar way to the formulation for object types which are actually present in the object model, the only difference being that the indicated designators do not denote any object types which are present in the object model (e.g. the rule "instances of flowchart object types are processed in the flowchart editor", the object model containing no "flowchart" object type but only the "program" object type. The "flowchart" object type is thus a virtual type.)

Associated with this is the introduction of one or more additional data fields into the data structures described by object types in the object model. This allows an additional data value to be stored on any object instance of these object types. SnapIns can fill this data value, e.g. when a new object instance is created—specifically, using a designator for a virtual type (e.g. "flowchart"). This means that the user interface no longer uses the rules which were indicated for the actual object type of the object instance, but rather the rules which were indicated for the virtual type whose designator is stored in the object instance's data field reserved for this.

The identifier for the virtual type can be entered or modified even after the object instance has been created. In this way, the user interface can present the user with a larger number of available object types than have actually been defined in the object model. In addition, new virtual types can be introduced at any time without the need for extension of the object model.

A prerequisite for this method is strict distinction between the functionalities in the engineering system: a class of functionalities relates to the actual object type of an object instance. By way of example, these are all functions concerning data storage, transfer into the runtime system or the lifecycle (creation, access, deletion) of object instances. By contrast, the other class of functionalities relates to the virtual type, provided that such a type has been entered in the newly introduced data field of the object instance. If a virtual type has not been entered, then the rules for the object type of the object instance are also used for these functionalities. This class includes, above all, the already cited functionalities of the user interface.

A project browser in the engineering system shows the project structure by displaying object instances and their links. There is a direct connection between project structure and object model to the extent that the object model contains, among other things, information regarding which object instances can possibly be created in a project and which relationships can arise between the instances of particular types.

FIG. 1 shows a specific example of the novel registration of a plurality of editors for an object type and the instantiation thereof in a plurality of objects. As is shown, an existing structured text editor, or one which is to be newly added, Editor__1 and also an existing flowchart editor, or one which is to be newly added, Editor__2 are registered for an Object type__1. The Object type__1 can thus be instantiated in the structured text format and likewise in the flowchart format. A respective Instance View link then ensures that the Structured Text object instance is edited by the structured text editor and the Flowchart object instance is edited by the flowchart editor on request.

The user can observe and edit object data in appropriate windows of the project browser. In the present example, the original software contains a structured text editor as SnapIn__1 in the workbench for the controller shown in FIG. 2. The basic engineering system of a development department or the engineering system of a system constructor provides an object Obj__1, registered for the structured text editor, after an object type has been instantiated. This means that the structured text editor is retrieved automatically when navigating onto the object Obj__1 in the project browser, so that the object Obj__1 thus becomes editable.

In addition, the basic engineering system provides an object Obj__2 which can, in principle, also be edited using the structured text editor. The object Obj__2 has been extended by two extension data elements Ext__1 and Ext__2. The number of extension data elements which are linked to the basic object can be chosen at random. The object Obj__2 having the two extension data elements Ext__1 and Ext__2 is registered for the additional flowchart editor SnapIn__2 in the present case. This means that the flowchart editor SnapIn__2 is automatically retrieved when navigating onto the extended object Obj__2 in the project browser, and the object is available for editing in the flowchart editor. In addition, the extension data elements can contain user-specific data, e.g. relating to an editor preferred by the user.

Figure 2:
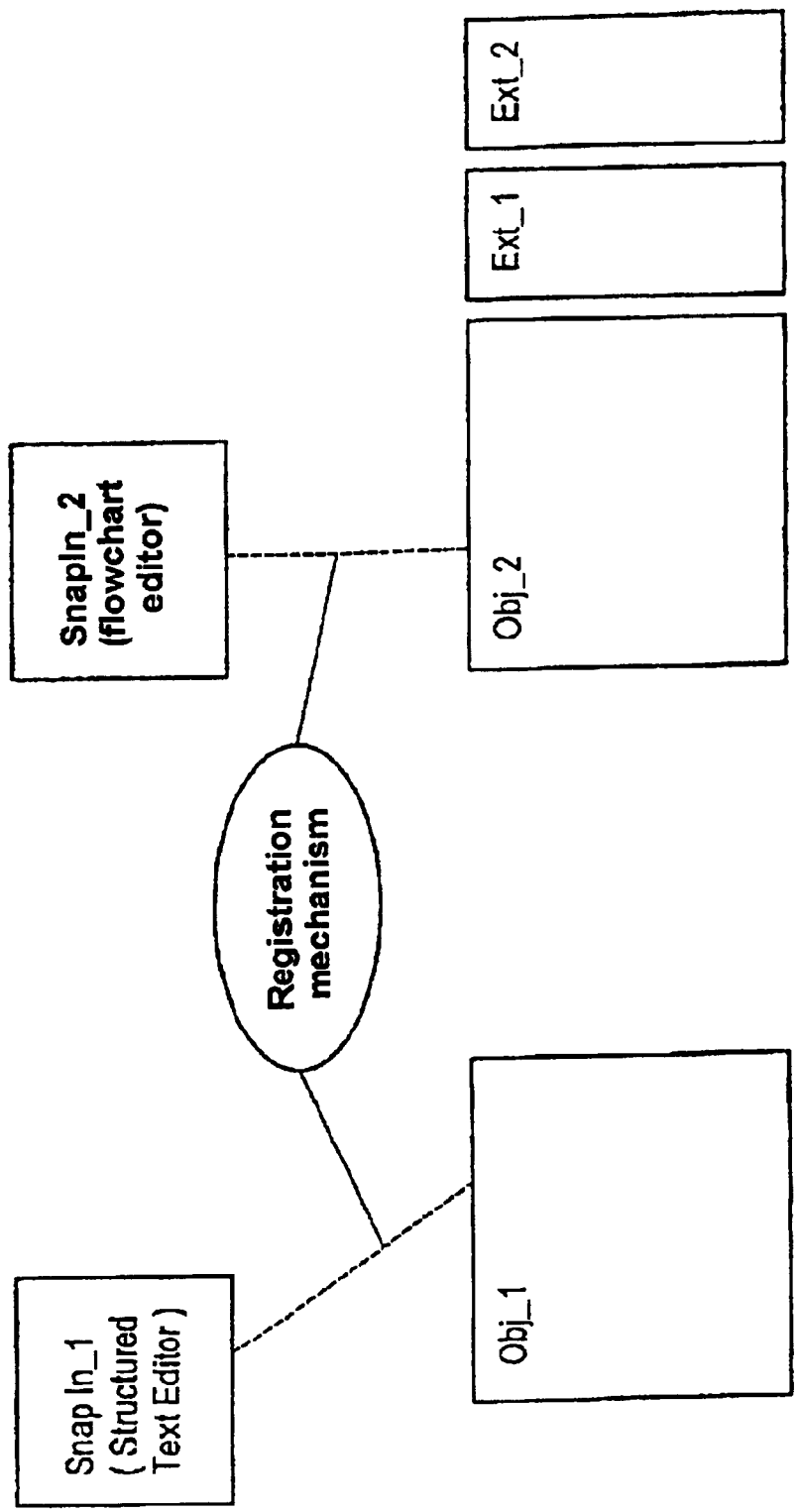
FIG. 2 shows a data structure diagram of an extension mechanism.

FIG. 2 illustrates an extension mechanism which can be used to extend a basic engineering system by an additional editor SnapIn_2 without changing the original functionality. The tools and the views for an object type are extended by adding additional data on the object type. In this context, data extensions are attached to existing object types and are homogeneously integrated into the existing data storage without extending the underlying engineering system software. A registration mechanism allows SnapIns or similar extension tools (SnapIn_2) to register on the object type with the respectively provided number of extensions and to create appropriate object instances for the tools and views.

First, this type of extension allows them to be integrated into the existing project data storage, and hence permits consistent data storage; and second allows them to be integrated into the existing object model, i.e. permits integration into all engineering functionalities connected to the object model, such as project browsers.

Figure 3:
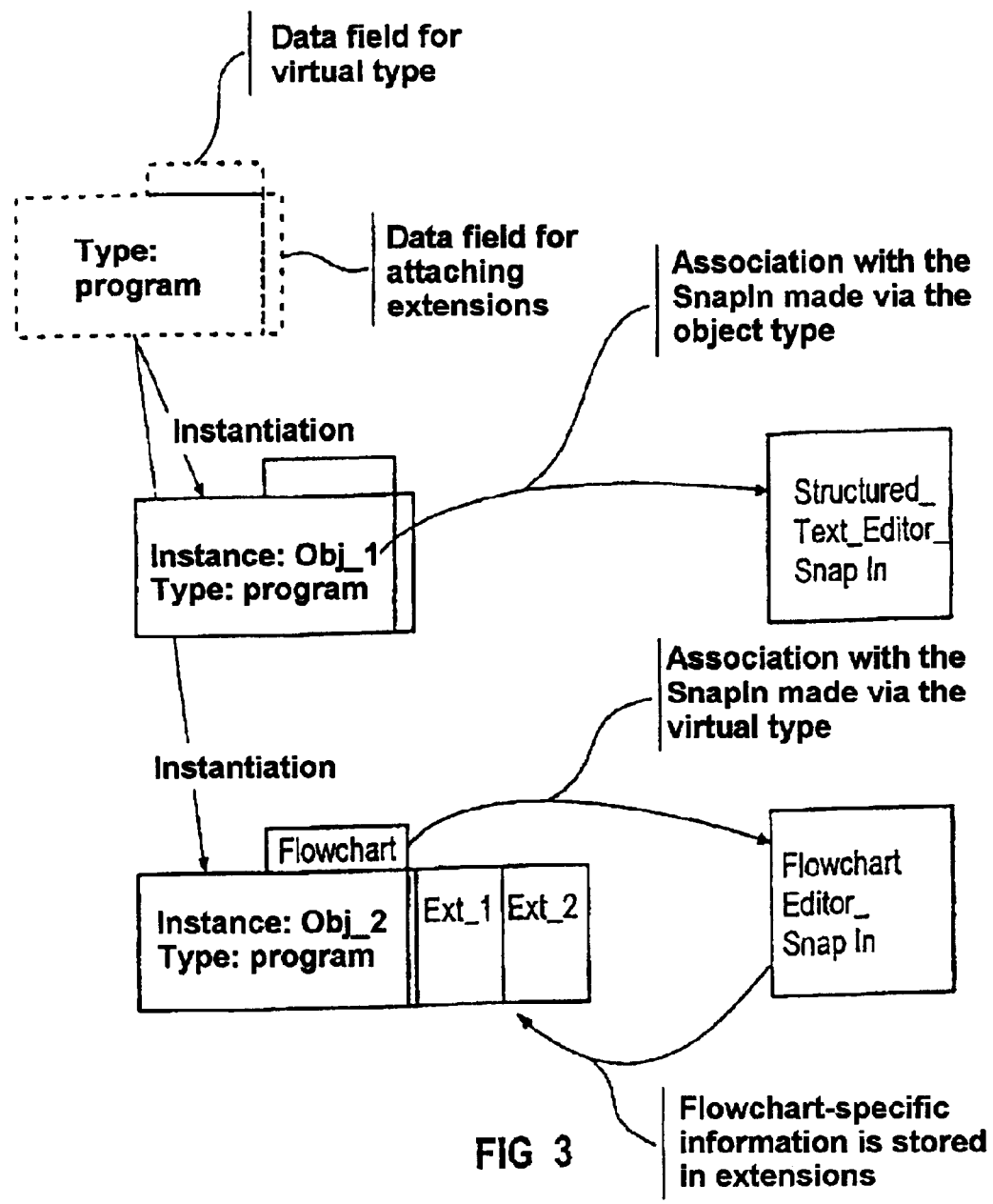
FIG. 3 shows a combination of the structures shown in FIGS. 1 and 2.

A combination of the embodiments of FIG. 1 and FIG. 2 is shown in FIG. 3. A "program" object type is provided with a data field DV for a virtual type when created in the engineering system. The data field DV can store a Virtual Type ID list or a Virtual Type ID field which can hold the registration information for an additional cool or SnapIn. In addition, a data field DE for attaching extensions is appended to the "program" object type.

The "program" object type can now be instantiated in the engineering system in two ways. First, it is instantiated for an object Obj_1, for which the data field DV is not used. The association with an editor is therefore made on a standard basis using the "program" object type. The other possible instantiation produces an object Obj_2. In this case, the data field DV is used for registration for a virtual type which is not part of the basic object model. In the present case, the object Obj_2 has been registered for the flowchart editor. This is to say that the Virtual Type ID field DV contains association information for the flowchart editor. The flowchart editor uses flowchart-specific information which cannot be stored in standard objects. Since the object Obj_2 has a data field DE available, however, the flowchart-specific information can be stored in one or more extensions Ext_1, Ext_2. The user can thus use individual SnapIns to the full extent.

In summary, the control system described above has the following advantages:

the functionality is represented using an object model;
the object model is effective in the engineering system and/or runtime system;
the object model is the basis for the engineering of the controller (e.g. for startup, programming, etc.);
the object model is the basis for the data storage of the controller;
the controller's engineering system based on the object model can be flexibly extended without touching the engineering system by introducing extensions;
all existing engineering operations and transactions on the object types (e.g. browser, viewer, copying, inserting, importing, exporting etc.) also act on the extensions and can be used in the same way, because the extensions are made directly on the object;
OEM extensions for extensions of the object types, new views to existing object types, new object types are generically possible and require no change to the basic software (engineering system);
an extension mechanism having a generic interface is available in order to make extensions in the user interface (new editors, new views) and/or in the data storage;
new engineering functionalities and new engineering views to existing object types in the object model can be added;
existing object types can be extended by creating additional data on the object type; and
new object types can be added to the available object model at any point.

We claim:

1. An apparatus for controlling or regulating an automation system based on a basic object model which represents the functionality of a runtime system of the automation system and/or of the automation system to be controlled or to be regulated, comprising a data processing device for processing a first object type having a predetermined data structure which is part of the basic object model defining a plurality of first objects representing at least a plurality of functional units of the automation system, and which can be instantiated for objects, wherein the data processing device is used to attach at least one type data field to the first object type to allow for an extension of the object model defining additional virtual object types having additional functionality not defined in said plurality of first objects.

2. The apparatus according to claim 1, wherein the data processing device is used to create and/or process a second object type as an additional object type, wherein the second object type is defined by the at least one type data field and the second object type is identical to the first object types and comprising an additional extension data field for providing additional information data for the second object type.

3. The apparatus according to claim 2, wherein the at least one type data field can store registration information for at least one standard or additional tools, for a specific editor.

4. The apparatus according to claim 3, wherein one of the at least one standard or additional tools is a standard tool comprising a standard editor and/or standard view, and another one of the at least one standard or additional tool is an additional tool comprising an extended editor and/or view having extended functionality, and wherein only the additional tool has access to the additional extension data field.

5. The apparatus according to claim 4, wherein a standard tool can be used on first and second object types.

6. The apparatus according to claim 1, wherein the at least one type data field can identify a virtual object type which is not part of the basic object model, and the virtual object type can be associated with a specifically designed editor by the type data field.

7. The apparatus according to claim 1, wherein the at least one type data field comprises a Virtual Type ID list which can be used to identify the additional virtual object types which are not part of the basic object model.

8. A method for controlling or regulating an automation system based on a basic object model which represents the functionality of a runtime system of the automation system and/or of the automation system to be controlled or to be regulated, the method comprising the steps of:

providing the basic object model comprising a first object type which has a predetermined data structure and can be instantiated for objects,
creating an object from the basic object model and attaching a type data field wherein the type data field either defines said first object type or a second object type with extended functionality, and
instantiating of the object for wherein in case the type data field defines the second object type, said second object type is associated with an additional tool which is not part of the basic object model.

9. The method according to claim 8, further comprising the step of attaching an extension data field to said object in case the type data field defines the second object type which stores data from or for the additional tool.

10. The method according to claim 8, wherein the type data field stores a Virtual Type ID list or a Virtual Type ID field which is used to associate object uniquely with one or more standard or additional tools upon instantiation.

11. The method according to claim 10, wherein a standard tool is a standard editor and/or standard view and an additional tools is an extended editor and/or view having extended functionality, and only the additional tool has access to the extension data field.

12. The method according to claim 10, wherein the standard tools include a browser, viewer, copying, inserting, importing and exporting, which can be used on the first and second object types.

* * * * *